United States Patent [19]

Meyer

[11] 4,382,649
[45] May 10, 1983

[54] MULTIPLE CABLE CONNECTOR BOX

[75] Inventor: Daniel Meyer, Rochester, Minn.

[73] Assignee: Communication Systems, Inc., Hector, Minn.

[21] Appl. No.: 224,130

[22] Filed: Jan. 12, 1981

[51] Int. Cl.³ ..................................... H01R 13/506
[52] U.S. Cl. .................................. 339/39; 174/60; 174/65 R; 339/122 R; 339/125 R
[58] Field of Search ............... 339/18 R, 31 R, 31 B, 339/31 M, 32 R, 32 M, 36, 39, 119 R, 122 R, 125 R, 128, 198 T, 156 R; 174/59, 60, 65

[56] References Cited

U.S. PATENT DOCUMENTS

| 3,683,314 | 8/1972 | Elkins | 174/59 |
| 3,705,378 | 12/1972 | Elkins | 339/208 |
| 4,103,985 | 8/1978 | Krolak et al. | 339/126 R |
| 4,290,664 | 9/1981 | Davis et al. | 339/156 R |

FOREIGN PATENT DOCUMENTS

| 1640354 | 12/1970 | Fed. Rep. of Germany | 174/60 |
| 700912 | 1/1966 | Italy | 174/65 R |
| 111887 | 8/1965 | Netherlands | 174/65 R |

Primary Examiner—John McQuade
Attorney, Agent, or Firm—Kinney, Lange, Braddock, Westman and Fairbairn

[57] ABSTRACT

A multiple cable connector box conductively connects a plurality of multi-conductor cables. Each cable has a first multi-contact connector which is conductively connectable to a second multi-contact connector supported within the multiple cable connector box. The box or housing has a plurality of openings with each multi-conductor cable extending through one of the openings. A plurality of flexible retaining posts can hold each second multi-contact connector within the box in at least two positions such that each cable can extend into the box through at least one of two different openings by changing the second connector's position within the box. Each opening not having one of the cables extending therethrough is closed off with a cover.

3 Claims, 7 Drawing Figures

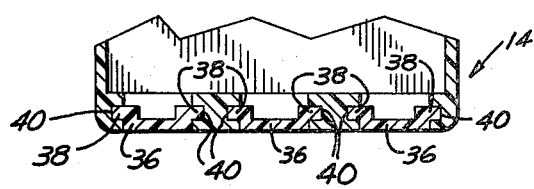
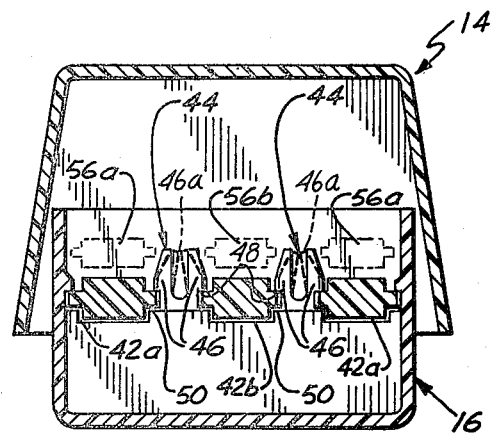
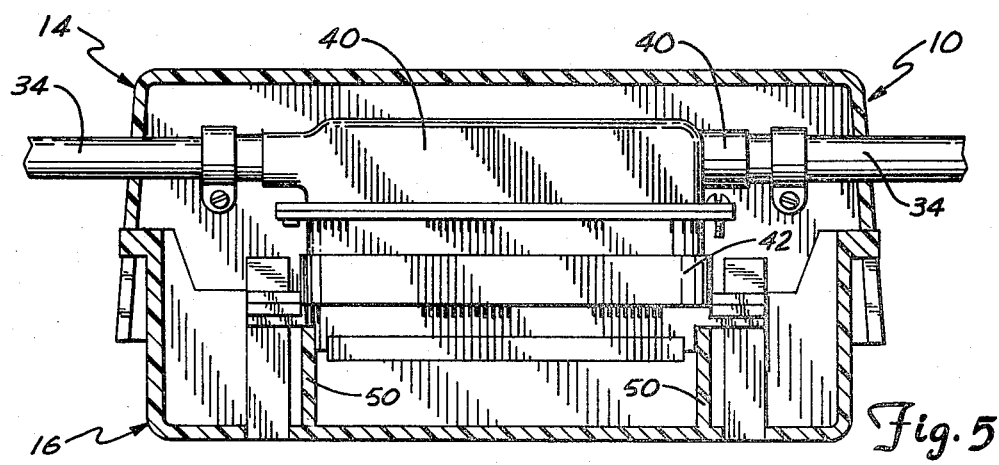
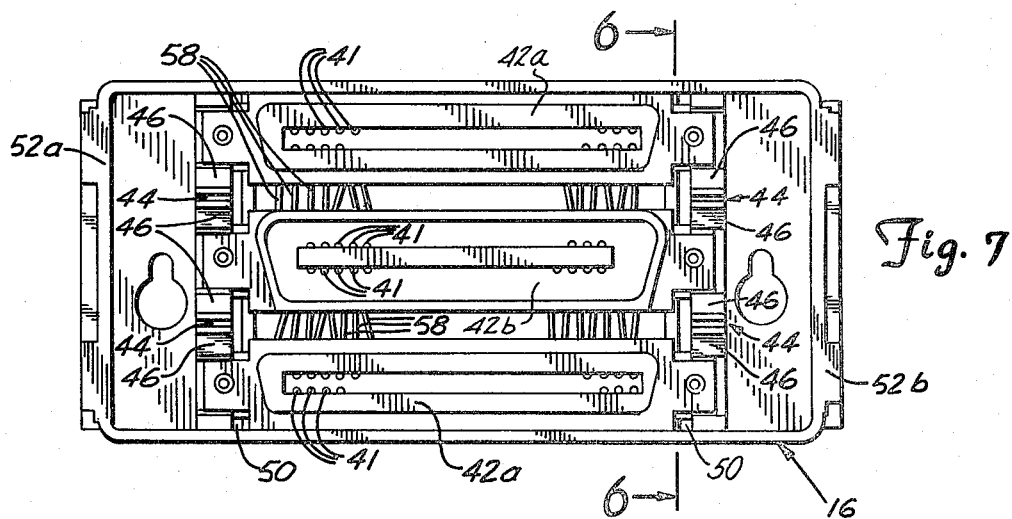

MULTIPLE CABLE CONNECTOR BOX

BACKGROUND OF THE INVENTION

1. Field of the Invention

The present invention relates generally to electrical connector boxes. In particular, the present invention is a multiple cable connector box which permits multi-conductor cables that run from both different and the same directions to be conductively connected in one box.

2. Description of the Prior Art

In the past, a plurality of multi-conductor cables have been conductively connected in differently designed connector boxes depending from which direction the multi-conductor cables extended from. More specifically, a differently designed connector box is used if the cables run from opposite directions than if the cables run in the same direction.

One example of a multiple cable connector box is described in a pending application, in U.S. Pat. No. 4,290,664 granted to Davis et al. on Sept. 22, 1981 and assigned to the same assignee as the present application. In the pending application, two multi-conductor cables with connectors are shown conductively connected to connectors of a housing on opposite side walls. The housing is separated into two halves and the connectors in the housing may be transposed by opening the housing and positioning the connectors in the directions compatible for connection to the multi-conductor cables and their connectors. However, the adapter of the pending application cannot facilitate more than two multi-conductor cables with multi-contact connectors and the connectors are attached at the outside of the housing of the cable connector box.

The Elkins U.S. Pat. No. 3,705,378 illustrates a cover for a pair of multi-contact connectors that connect a pair of cables. The Elkins patent also facilitates only two multi-conductor cables and is not useful in the situation of multi-conductor cables extending from the same and different directions.

The Krolak et al. U.S. Pat. No. 4,103,985, illustrates a multiple cable connector box with multi-contact connectors fixedly attached within a housing for connection with another multi-contact connector attached to a multi-conductor cable extending through an opening in the housing. This type of connector housing, however, does not provide a solution of connecting multi-conductor cables which extend from different directions.

SUMMARY OF THE INVENTION

The present invention includes a multiple cable connector box having connectors for conductively connecting a plurality of cables with multiple contact connectors mating with the connectors supported in the box that can extend from both the same and opposite directions toward the box and which include means for closing the unused cable passage openings in the box.

Each multi-conductor cable has a first multiple contact connector for connection with a second multiple contact connector. The box has a plurality of openings through which the multi-conductor cables extend. A plurality of flexible retaining posts within the box releasably retain the second multiple contact connectors in a plurality of positions. Each multi-conductor cable is permitted to extend into the housing through at least one of two openings by arranging the position of the second multi-contact connector to facilitate the reception of the first multi-contact connector in a direction compatible with the direction that the multi-conductor cable is positioned. Covers are provided for the openings not having one of the cables extending therethrough.

The multi-cable connector of the present invention provides a universal connector box suitable for connecting multi-conductor cables within the box that are positioned in the same or different directions. The covers covering the openings not used by any cables protect the connectors within the box from environmental conditions.

BRIEF DESCRIPTION OF THE DRAWINGS

FIG. 4 is a fragmentary cross sectional view taken along the line 4—4 in FIG. 3;

FIG. 5 is a cross sectional view taken along the line 5—5 in FIG. 1 of the multiple cable connector box;

FIG. 6 is a cross sectional view taken along the line 6—6 in FIG. 7 of the multiple cable connector box;

FIG. 7 is a top plan view of the bottom half of the multiple cable connector box.

DETAILED DESCRIPTION OF THE PREFERRED EMBODIMENT

Figure 1:
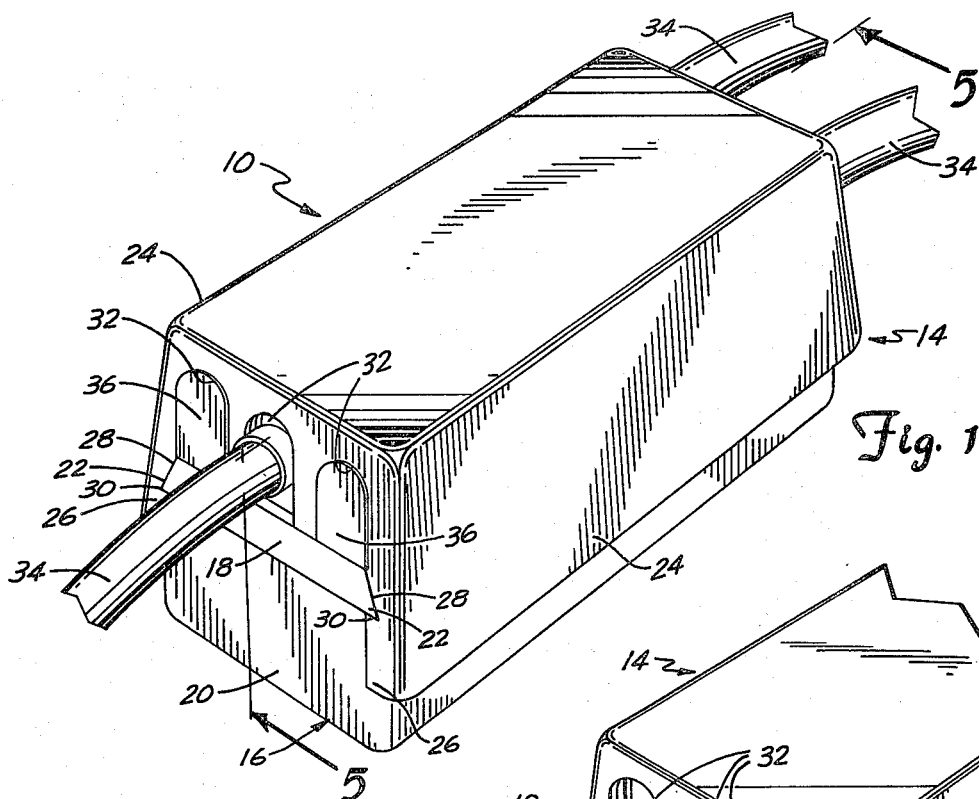
FIG. 1 is a perspective view of the preferred embodiment of the multiple cable connector box of the present invention.

A multiple cable connector box of the present invention is generally indicated at 10 in FIG. 1. The multiple cable connector box 10 includes a top half or cover 14 and a bottom half or base 16. The top half 14 and the bottom half 16 are preferably made of a thermoplastic material.

The top half 14 and the bottom half 16 are detachably connected to each other preferably by a snap-on type connection. In the preferred embodiment of the present invention, the snap-type connection includes lugs 18 on both end walls 20 (one not shown) on the bottom half 16. Each lug 18 has two outwardly extending male sections 22 on opposite ends of lugs 18. The top half 14 has a pair of flexible side walls 24 with latch portions 26 perpendicular to the side walls 24 which overlap the end walls 20 of the bottom half 16. The latch portions 26 each have cutaways 28, with each cutaway 28 having a retaining edge 30 positioned such that when the top half 14 is placed in engagement with the bottom half 16, the flexible side walls flex outwardly permitting male sections 22 to cooperate with cutaways 28 such that the retaining edges 30 adjacently abut male sections 22 and retain top half 14 in a snap type connection with the bottom half 16. To disconnect the top half 14 from the bottom half 16, the flexible walls 24 are flexed outwardly by an instrument such as a screwdriver disengaging the male sections 22 from the cutaways 28.

The box 10 has a plurality of openings 32 preferably with an equal number of the openings on opposite ends of the box. The openings 32 are preferably located in the top half 14. It should be understood that although only three openings are shown in the preferred embodiment in FIG. 1, more than three openings are contemplated. Preferably, there are an equal number of openings 32 on the opposite ends of the box 10 and each opening 32 on one end of the box has an alignable opening 32 on the other end of the box.

Figure 2:
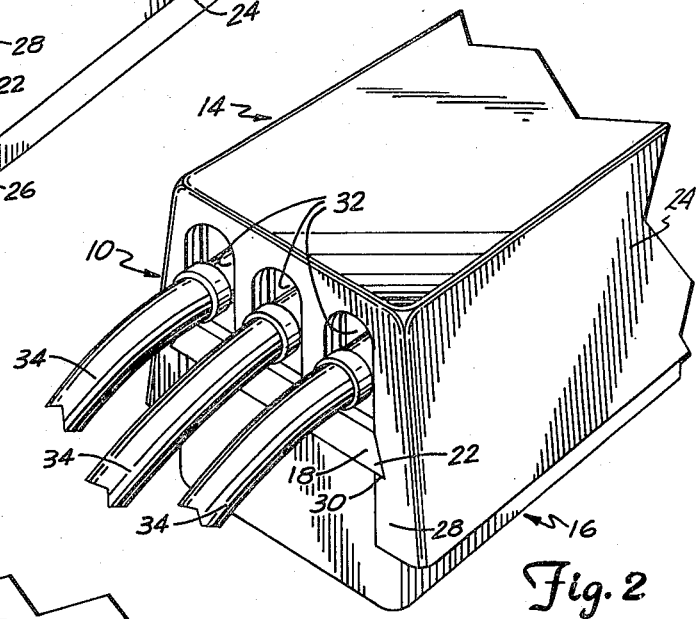
FIG. 2 is a partial perspective view of the multiple cable connector box having multi-conductor cables entering into the box all on one side.

A plurality of multi-conductor cables 34 extend into the interior of the box 10 through openings 32. The multi-conductor cables 34 are conventional type multi-conductor cables having a plurality of wires surrounded by insulating material. The multi-conductor cables 34 extend into the box in any number of possible combinations. Two of the combinations are illustrated in FIGS. 1 and 2. In FIG. 1, two multi-conductor cables 34 project into the the box 10 on one end and a third multi-conductor cable 34 projects into the box 10 on the other end. As shown in FIG. 2, three multi-conductor cables project into the box 10 at the one end. As can be easily understood from the figures, the present invention includes all combinations of cables entering the box and it should be realized that the number of combinations will increase as the number of openings 32 is increased.

Figure 3:
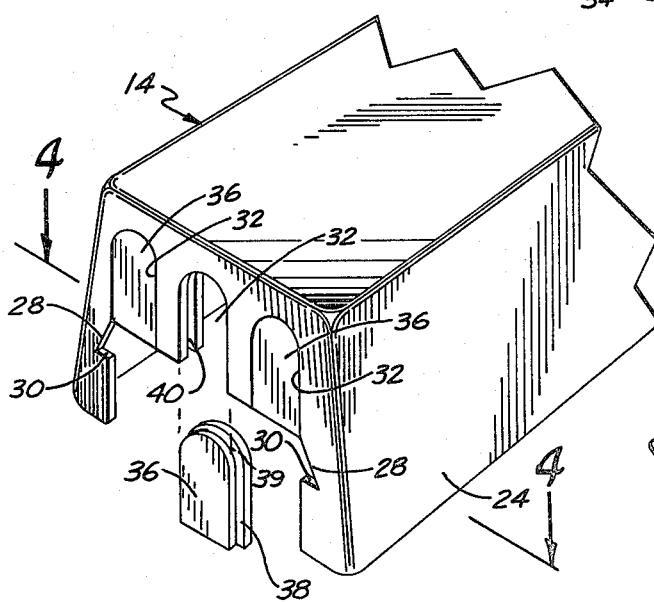
FIG. 3 is a perspective view of the top half of the multiple-cable connector box illustrating the removal and placement of the covers used for the box opening.

The openings 32 through which no cables extend have opening covers 36 cooperating with the edges of the openings to close the openings, as illustrated in FIGS. 1, 3 and 4. Preferably the opening covers 36 have a flanged rib 38 which cooperates with a groove 40 located along the edge of the opening 32 by sliding along the groove 40. The opening cover 36 is thus positioned to cover the opening 32 by engaging flanged ribs 38 into the groove 40 as indicated by broken lines 39 in FIG. 3. The opening covers 36 preferably close the openings 32 not containing any multi-conductor cables 34 prior to engaging the top half 14 with the bottom half 16. When the top half 14 is engaged with the bottom half 16, the opening covers 36 are retained in place by the bottom edges abutting against the top edge of lug 18 of the bottom half 16. The opening covers 36 protect the interior of the housing from the environment.

The multi-conductor cables 34 are attached to first or top multi-contact connectors 40. The multi-contact connectors 40 are conventional connectors such as are manufactured by 3M, Inc. of St. Paul, Minnesota and have a plurality of contacts, preferably twenty-five pair, that are conductively connected to a multi-conductor cable 34, as shown in FIG. 5. The multi-conductor cables 34 through the connectors 40 are conductively connected to a bottom multi-contact connector 42 mounted in the box 10. The bottom multi-contact connectors 42 are conductively connected to each other by a plurality of wires 58. The bottom multi-contact connectors 42 are also conventional multi-contact connectors preferably having twenty-five pair of contacts 41 all of which are not shown in FIG. 6 for purposes of clarity. It should be understood that the top multi-contact connectors 40 may be either female or male and bottom multi-contact connectors 42 also may be either male or female, but selected to mate with the top connectors.

The bottom multi-contact connectors 42 are held in place by a plurality of flexible retaining posts 44, as shown in FIGS. 6 and 7. Preferably, the flexible retaining posts 44 have oppositely facing flexible spaced-apart retaining prongs 46. The retaining prongs 46 each have retaining edges 47 which hold down bottom multi-contact connectors 42 against a plurality of supports 50 which are preferably integral to bottom half 16 of the housing 11, as shown in FIGS. 6 and 7. As illustrated in FIG. 7, both male connectors 42a and female connectors 42b are held in place by flexible retaining posts 44.

As shown in the preferred embodiment, the male and female multi-contact connectors 42a and 42b are aligned within the housing such that multi-conductor cables 34 can extend through openings 32 of the housing from either end 52a or 52b along a substantially straight path.

In use, the male and female connectors 42a and 42b may easily be removed from base support 50 by flexing flexible prongs 46 towards each other as indicated by broken lines 46a in FIG. 6. Flexing the flexible prongs 46 towards each other removes retaining edges 48 from engagement with the multi-contact connectors 42a, 42b. In this manner, multi-contact connectors 42a, 42b are simply lifted upwardly as indicated by broken lines 56a, 56b. Consequently, the multi-contact connectors 42a, 42b may be positioned within the housing 11 in a position to receive a top multi-contact connector 40 from either end 52a or 52b of the housing. Since the multi-contact connectors 42a, 42b are conductively connected to each other with a plurality of wires 58, the multi-contact connectors 42a, 42b may be rotated 180° so the connectors are positioned to receive the top connectors of cables extending in either of the two directions along the box's longitudinal axis by bending and twisting the wiring 58. To retain the bottom multi-contact connectors 42a, 42b in the position desired, the multi-contact connectors 42a, 42b are simply pressed down against base support 50 flexing the prongs 46 towards each other as indicated by broken lines 46a in FIG. 6. The flexible prongs 46 then snap back with retaining edges 48 reverting back to their retaining position retaining the multi-contact connectors 42a, 42b against the base support 50 in a secure position.

CONCLUSION

The present invention provides a connector box which permits multi-conductor cables to be run from either the opposite directions or from the same direction to the box and connected within the same connector box. A plurality of openings positioned on both sides of the box provide cable entry. Opening covers are easily placed into position to cover the openings not being used by any multi-conductor cable.

Although the present invention has been described with reference to the preferred embodiment, persons skilled in the art will recognize that changes may be made in form and detail without departing from the spirit and scope of the invention.

What is claimed is:

1. A multiple cable connector box for conductively connecting a plurality of multi-conductor cables, each cable having a first multi-contact connector, for conductive connection with a plurality of second multi-contact connectors, the second multi-contact connectors having flange portions at each end, the cable connector box having:
    an upper half and lower half with the lower half including a lug positioned at opposite ends with each lug having male portions extending outwardly therefrom and with the upper half having a pair of opposite facing flexible side walls with latch portions overlapping the lower half, each latch portion having a cut-away to receive a corresponding male portion of each lug for attachably connecting the lower half with the upper half;
    a plurality of openings defined in opposite ends of the upper half;
    a plurality of supports mounted within the lower half, each support having a plurality of integral flexible prongs and each prong engaging a flange portion of only one multi-contact connector and the prongs positioned to attachably retain the second multi-contact connectors against the supports in one of a plurality of positions, each position being with the longitudinal axis of the connectors generally in alignment with the openings in each end of the box; each multi-conductor cable connectable to a corresponding second multi-contact connector and extending into the box through a corresponding end opening, the corresponding end opening aligned with the corresponding second multi-contact connector; and a separate removable covering means to cover each of the openings in the box not having a multi-conductor cable extending therethrough.

2. The multiple cable connector box of claim 1 wherein the covering means comprise a plurality of generally flat covers each having a flanged rib along the edges thereof and wherein the plurality of openings are defined by an edge groove for cooperating with the rib of a cover such that each cover may be slidably inserted into an opening with the flanged ribs engaging the grooves.

3. The multiple cable connector box of claim 2 wherein the lower half of the box has lugs thereon positioned to engage the covers and retain them in the respective openings when the upper and lower halves are attachably connected.

* * * * *